UNITED STATES PATENT OFFICE.

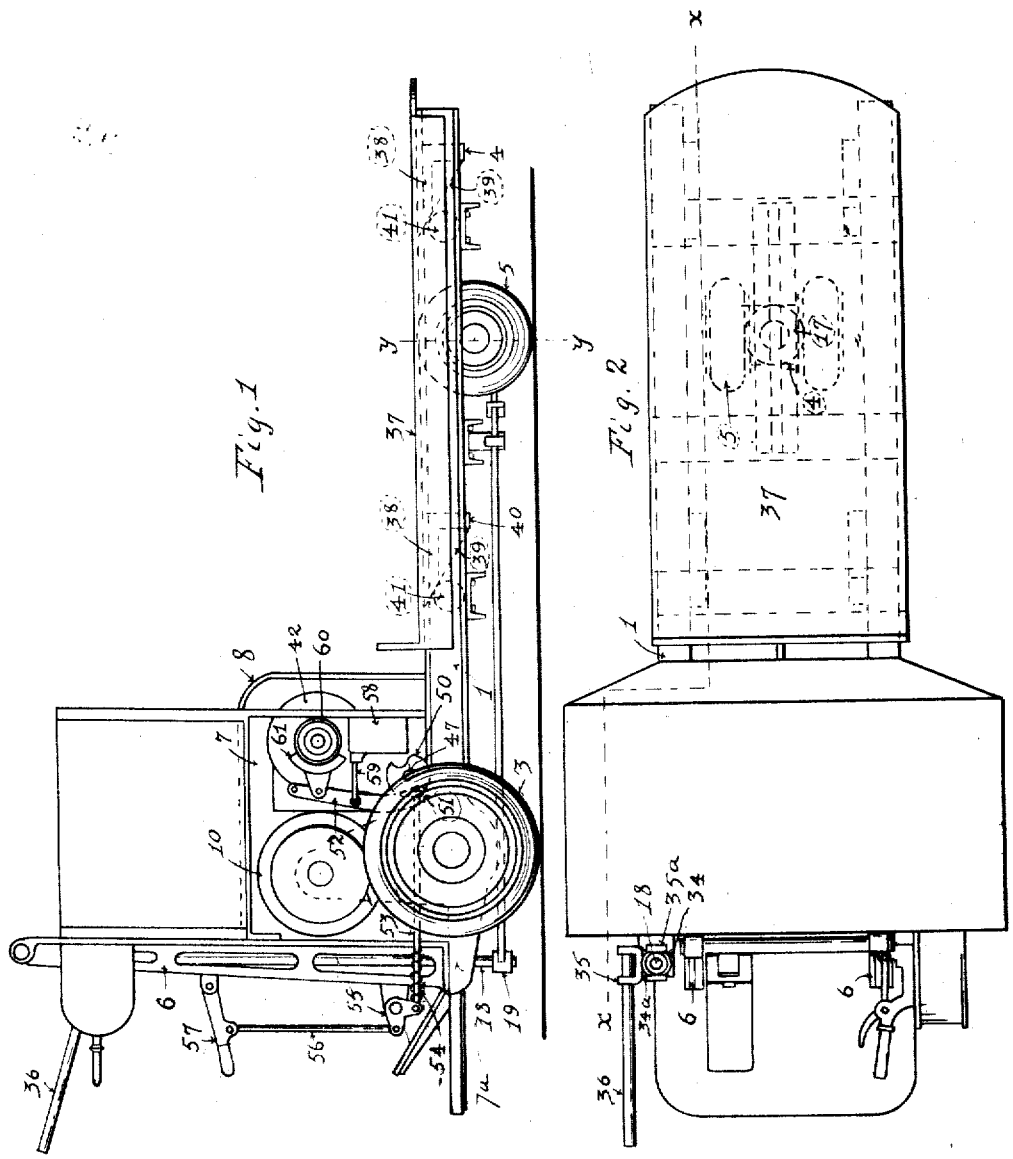

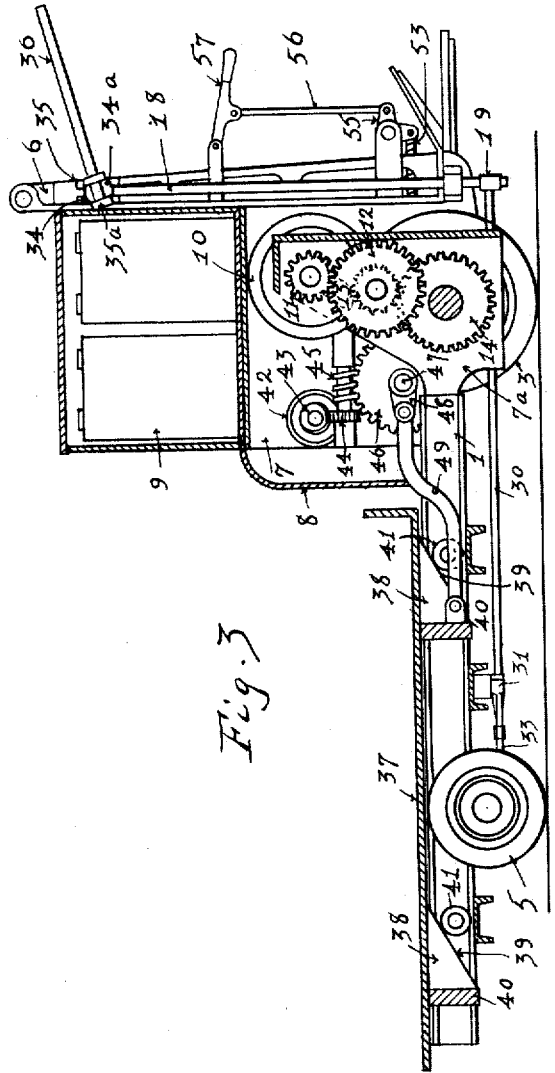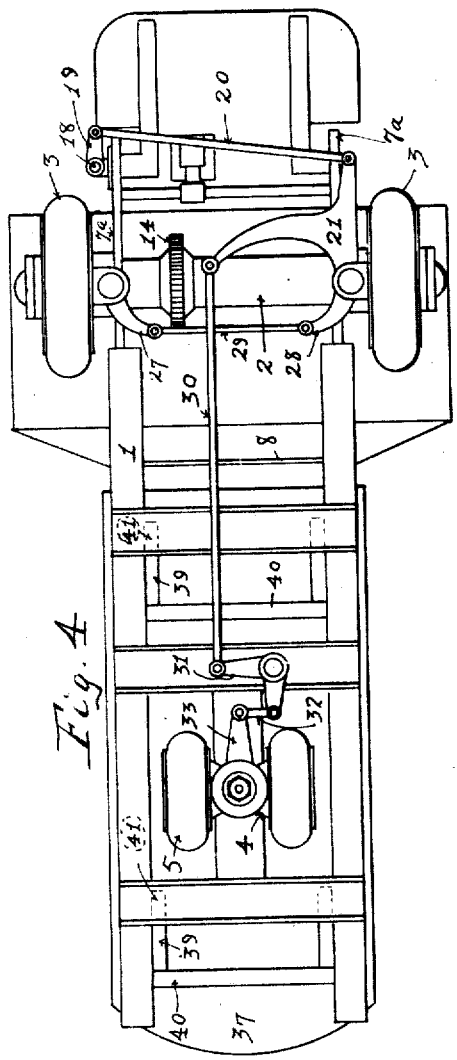

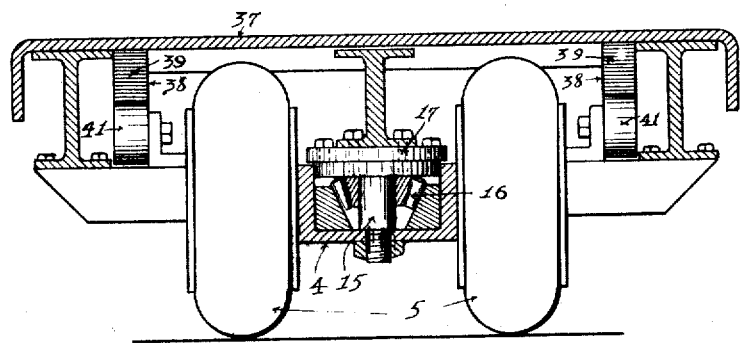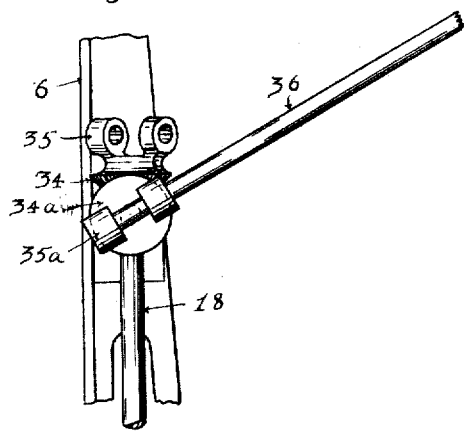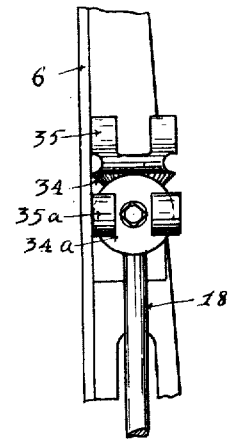

WILLIAM C. CARR, OF BUFFALO, NEW YORK, ASSIGNOR TO THE AUTOMATIC TRANSPORTATION COMPANY, OF BUFFALO, NEW YORK.

TRUCK.

1,271,273.   Specification of Letters Patent.   Patented July 2, 1918.

Original application filed January 3, 1916, Serial No. 69,978. Divided and this application filed January 25, 1917. Serial No. 144,483.

*To all whom it may concern:*

Be it known that I, WILLIAM C. CARR, a citizen of the United States, residing at Buffalo, in the county of Erie and State of New York, have invented certain new and useful Trucks, of which the following is a specification.

My invention relates to trucks, and more particularly to steering mechanism for power-propelled trucks of the type and character shown in my pending application, Serial Number 69,978, filed January 3, 1916, motor trucks, of which this is a divisional application, and other types of analogous character.

While the several specific improvements of this invention will appear from the drawings, specifications and claims herewith, it consists broadly in the four-wheel steering construction shown and described and the mechanism for effecting the same.

Referring to the drawings herewith, Figure 1 is a side elevation. Fig. 2 is a plan view. Fig. 3 is a longitudinal section on the line x—x of Fig. 2 looking toward the center of the machine. Fig. 4 is an underside plan view. Fig. 5 is a section on y—y, Fig. 1. Fig. 6 is a detail side elevation of the steering head with the steering lever inserted to swing in a vertical plane. Fig. 7 is a similar view with the steering lever removed and the parts in the straight-ahead position.

I will first describe the general structure of the truck. A truss frame 1, constructed preferably of I-beams and channel irons, carries the axle 2 of the driving wheels 3 and also the pivoted axle 4 of the wheels 5. As will hereafter appear, both pairs of wheels are steered simultaneously from a common steering source. Mounted vertically on the frame 1 are heavy pillars 6 which, in connection with the side plates 7 and the frame extensions 7 which are rigidly secured to said pillars and to said frame, carry the motors and their mechanisms. A metal covering 8 secured to the side plates 7 covers in the mechanism, front and top, and forms the floor for the battery situated directly above the motors. The battery 9 is housed on all sides by metal plates.

The wheels 3 are driven by the mechanism clearly shown in Fig. 3, which consists of a motor 10 taking current from the battery 9, a spur-gear 11 in mesh with a gear 12 mounted in rotation with a spur-gear 13 in mesh with a rim-gear 14 on the differential.

Referring now especially to Figs. 4 and 5, it will be seen that the wheels 5, 5, carry the greater part of the great load for which the truck is designed. The axle 4 is pivoted to a king-post 15, and between this post and axle is an antifriction bearing 16, and to preserve alinement of this bearing and to prevent undue and uneven strain upon it, the king-post 15 has an extension or flange 17 which extends over the axle 4, normally out of frictional contact with it but sufficiently close to prevent side strain on said bearing. When it is understood that such a truck is designed to lift and carry weights of one or more tons, the necessity and importance of this bearing and other features of strength and power herein described will be recognized.

The steering mechanism is clearly shown in Figs. 3, 4, 6, and 7. Starting from the steering-post 18 (the steering head being hereafter described), this post 18 has rigidly mounted upon its lower end a lever 19, to which is pivoted a rod 20, which in turn is pivoted to one arm of a bell-crank lever 21 rigidly secured to the hub member of one of the steering knuckles of the wheels 3. The hub members of the two steering knuckles are connected by levers 27 and 28 and a rod 29 pivoted to their free ends. The other arm of the bell-crank lever 21 has pivoted to it the rod 30, the other end of which rod is pivoted to a bell-crank lever 31 which is pivoted to a truss of the frame 1. To the other arm of the bell-crank lever 31 is pivoted a rod 32, which in turn is pivoted to a lever arm 33 rigidly secured to the axle 4 of the wheels 5.

By this improvement, rotation of the steering-post 18 affects all four wheels, turning the two pairs in opposite directions which ever way said steering-post may be turned; and thus the truck may be turned about practically within its own length. Moreover, and especially it is to be noted, that, by proportioning the length of the levers 21, 31, and 33, the proportion of rotation out of parallelism of the wheels 3 and 5 may be determined, and the speed of rotation of the wheels 5 upon their steering axis may be made so much greater than that of the wheels 3, that the turning center of the truck may be brought back almost to the axis of the wheels 3. Thus the operator may swing the load-carrying end of the truck to right or left to get under a load or to deposit a load in a desired position with minimum movement of the power end of the truck. And in the use of trucks of this type, especially in factories, machine shops, and the like, this capability of steering is of great importance.

Referring now especially to the steering-head shown in Figs. 3, 6, and 7, in the operation of a truck of this type, often in close quarters, often up against a wall or other object, it becomes necessary to provide other than the ordinary steering wheel or lever. I will now describe this improvement. Mounted upon the upper end of the steering-post 18 and also upon a pivot on the bearing for the upper end of said steering-post are two identical bevel-gears 34 and 34ª. The bevel-gear 34 is rigidly mounted on the steering-post 18 and the bevel-gear 34ª is pivoted to the bearing as stated. These gears are in mesh and have eyes 35 and 35ª, respectively, to receive a steering lever or rod 36. If the operator inserts the steering lever 36 in the eyes 35 of the gear 34, the truck may be steered by moving said rod in horizontal plane. If inserted in the eyes 35ª of the gear 34ª, the steering may be effected by moving said rod in vertical plane.

The application and control of power to the propelling motor is clearly shown and described in my said pending application, Serial Number 69,978, to which reference is made for a detailed description, and reference is also made, with respect to certain electrical control features to my Patents No. 1,139,954, May 18, 1915, and No. 1,185,630, June 6, 1916.

I have shown this invention applied to a lifting and carrying truck of the type of my said application Serial Number 69,978, and while I do not limit my present invention to that particular form of lifting mechanism or to trucks of the lifting type, the following description shows an application of my invention.

The lifting or raising platform 37 has bolted to its under side raising blocks 38 which have inclined bearing edges 39 and which edges terminate at their lower ends in flat, horizontal surfaces 40. Pivoted to the cross trusses of the frame 1 are rollers 41, so positioned that the edges 39 of the raising blocks 38 travel on them. When the lifting platform is down, as shown in the drawings, it rests upon the horizontal I-beams of the frame 1. When it is drawn rearwardly by the mechanism hereafter described, the inclined edges 39 of the raising blocks 38 travel up on the rollers 41, thus raising the platform until, at the completion of the raising movement, the flat, horizontal surfaces 40 rest upon the rollers 41, so that there is no tendency of the platform to slide down upon the inclined edges 39.

A motor 42 takes its current from the battery 9, which also supplies current to the motor 10. The motor 42 is coupled to the shaft of a worm 43, which is in mesh with a worm-gear 44 which is rigid upon a common shaft with a worm 45, which is in mesh with a worm-gear 46. This worm-gear 46 is rigid upon a shaft 47, which carries upon one end a crank 48, and to this crank 48 is pivoted a connecting-rod 49, the other end of which is pivoted to the rear raising block 38.

Mounted upon the other end of the shaft 47 is a cam 50, which is diametrically recessed to receive and seat a follower 51 on a lever 52, as shown in Fig. 1. These recesses are positioned so as to seat the follower when the crank 48 is in either extreme position,—that is, when the platform 37 is either clear down or clear up. The lever 52 is pivoted at its upper end to a fixed part of the machine and has upon the pivot of the follower 51 a rod 53 which is normally drawn inwardly toward said cam 50 by a spring 54. To the outer end of the rod 53 is pivoted one arm of a bell-crank lever 55, which is pivoted to a lug on the standard 6, and the other arm of said bell-crank lever 55 is pivoted to a rod 56, which in turn is pivoted to a hand-lever 57, which also is pivoted to a lug on the standard 6. The parts just described are shown on Fig. 1.

Within an oil-containing casing 58 is mounted an ordinary electric knife-switch which is capable of opening and closing the circuit of the motor 42 by means of a rod 59 pivoted to said knife-switch and to said lever 52. When the follower 51 is seated in the cam 50, the switch is open, and when the follower is riding upon its surface, the electric switch is closed.

Pivoted to the lever 52 (see Fig. 1) is a brake 61, and upon the shaft of the motor 42 is a brake-drum 60 with which it engages. When the follower 51 seats as above described and opens the electric switch, it also brings the brake 61 into contact with the drum 60, thus stopping the motor 42 and holds it and its gearing against movement until the lever 52 is moved to close said electric switch.

In combination with the mechanism just described, my invention provides a power truck capable of handling very heavy loads in close quarters.

Having thus described my invention, I claim:

1. In a power driven truck, the combination with a frame of a pair of knuckle-joint mounted wheels adjacent to one end of said frame, knuckle joints and a driving shaft for said wheels and a motor and mechanism for driving said wheels mounted over said end of said frame, a pair of axle-mounted wheels and an axle therefor pivoted underneath said frame and positioned to carry the major portion of the truck load, a steering head and lever and rod connections between said head and said steering knuckles and said axle so arranged that all four wheels are steered simultaneously.

2. In a power driven truck, the combination with a frame of a pair of knuckle joint mounted wheels adjacent to one end of said frame, knuckle joints, a driving shaft and a motor therefor, a pair of axle-mounted wheels and an axle therefor pivoted underneath the said frame near the load-carrying center of said platform portion of said frame, and means for steering all four wheels simultaneously comprising a steering head, a bell-crank lever on the hub member of one of said knuckle joints and a lever and rod connection between it and said steering head, lever and rod connections between said knuckle joints, a bell-crank lever pivoted to said frame, a rod connecting said bell-crank lever on said knuckle joint with one arm of said bell-crank lever pivoted to said frame, a lever arm on said axle and a rod connecting it with the other arm of said bell-crank lever pivoted to said frame.

3. A power-driven truck comprising a frame, a pair of knuckle-joints secured adjacent to one end thereof, a pair of wheels on said knuckle-joints, means for transmitting power to said wheels, a second pair of wheels positioned underneath said frame and near the center of the load-carrying portion of said frame to carry the greater portion of the truck load, an axle for said last-mentioned wheels, a king-post mounted on said frame, a steering-post and lever and rod connections connecting said knuckle-joint wheels and the axle of said second pair of wheels for effecting steering of all four wheels from a single steering-post.

4. In a power-driven truck, in combination with a frame, a pair of wheels and knuckle-joints connecting the same with said frame, a second pair of wheels located to carry the greater portion of the truck load and a short axle for said wheels, a king-post on said frame, an anti-friction bearing for said king post and axle, a flange on said king-post extending over the bearing portion of said axle to engage therewith in case of undue side strain upon said bearing and means for steering all four wheels.

5. In a power-driven truck, the combination of a vertical steering-post and connections for steering the wheels of a truck, with a steering-head comprising a bevel-gear rigidly mounted upon the upper end of said post having eyes adapted to receive a steering lever, a similar bevel-gear in mesh with said first-mentioned gear pivoted to a fixed part of the device, and eyes on said last-mentioned bevel-gear adapted to receive a steering lever, whereby steering may be effected by inserting the steering lever in the eyes of said first-mentioned gear and moving it in horizontal plane, or by inserting the same in the eyes of said second-mentioned gear and moving it in vertical plane.

6. In a power-driven truck, the combination with a frame of a pair of knuckle-joint steering wheels and knuckle-joints therefor and power means connected with said wheels for propelling the truck, a pair of load-carrying wheels mounted on an axle and a pivot connecting said axle with said frame, steering means for said knuckle-joint wheels and lever connections between a steering element of said knuckle-joint wheels and the axle of said load carrying wheels, whereby all four wheels are steered simultaneously from a common source, and whereby the proportional steering movement of said two pairs of wheels may be determined by proportionment of said lever connections.

7. In a power-driven truck, the combination with a frame and supports for the power mechanism at one end and a load-carrying platform at the other end, a pair of knuckle-joint propelling and steering wheels adjacent the power end, a pair of axle-mounted load-carrying wheels having a short axle pivoted to the frame adjacent the load-carrying center of said platform, steering means, a lever on a moving element of said steering means, a lever on said axle and connections between said levers, whereby all four wheels are steered simultaneously and whereby the steering movement of said axle-mounted wheels with reference to the steering movement of said knuckle-joint wheels may be proportioned by said lever connections.

WILLIAM C. CARR.